United States Patent [19]

McAllister et al.

[11] Patent Number: 5,104,012

[45] Date of Patent: Apr. 14, 1992

[54] FLEXIBLE TUBE ATTACHABLE TO A SPOUT HAVING A FINGER TAB TO MAINTAIN ATTACHMENT

[76] Inventors: David A. McAllister, 1247 Greenland, Memphis, Tenn. 38134; Richard A. Sweat, 9301 Osborn Rd., Arlington, Tenn. 38002

[21] Appl. No.: 643,176

[22] Filed: Jan. 18, 1991

[51] Int. Cl.⁵ .............................................. B67D 3/00
[52] U.S. Cl. ................................ 222/528; 222/530; 222/567
[58] Field of Search ............... 222/527, 530, 567, 568, 222/562, 528

[56] References Cited

U.S. PATENT DOCUMENTS

| | | | |
|---|---|---|---|
| 2,006,194 | 6/1935 | Bertschinger | 222/567 |
| 2,580,811 | 1/1952 | Martinsen | 222/466 |
| 2,792,976 | 5/1957 | Stewart | 222/530 |
| 3,009,498 | 11/1961 | Fohr | 222/527 X |
| 3,181,745 | 5/1965 | Grobowski | 222/530 X |
| 3,439,846 | 4/1969 | Evras | 222/528 X |
| 3,726,447 | 4/1973 | Klygis | 222/567 |
| 3,980,210 | 9/1976 | Kligerman | 222/530 X |
| 4,009,805 | 3/1977 | Klygis et al. | 222/530 |
| 4,080,989 | 3/1978 | Chapelsky et al. | 222/530 X |
| 4,108,222 | 8/1978 | Kaufman | 141/337 |
| 4,111,340 | 9/1978 | Greehow et al. | 222/527 |
| 4,124,049 | 11/1978 | Yamaguchi | 222/530 X |
| 4,231,497 | 11/1980 | Bourbon | 222/527 |
| 4,453,653 | 6/1984 | Cahpelsky et al. | 222/528 |
| 4,753,371 | 6/1988 | Michielin et al. | 222/530 X |
| 4,817,832 | 4/1989 | Nagy | 222/530 |
| 4,825,915 | 5/1989 | Hess et al. | 141/337 |
| 4,896,707 | 1/1990 | Cowles | 141/337 |
| 4,930,667 | 6/1990 | Holzner, Sr. | 222/568 X |

FOREIGN PATENT DOCUMENTS

| | | | |
|---|---|---|---|
| 1237513 | 6/1960 | France | 222/527 |
| 631370 | 11/1949 | United Kingdom | 222/527 |

*Primary Examiner*—Robert P. Olszewski
*Assistant Examiner*—Boris Milef
*Attorney, Agent, or Firm*—Walker & McKenzie

[57] ABSTRACT

A dispensing device for helping to pour the contents of a first container into a second container without spillage. The device includes a flexible tube having an opened first end for being positioned on the pour spout of the first container, having an opened second end for being positioned adjacent the inlet opening of the second container, and having an opened interior extending between the opened first end and the opened second end for allowing the contents of the first container to be poured through the opened interior of the tube from the pour spout of the first container into the inlet opening of the second container. The device includes structure for securing the opened first end of the tube on the pour spout of the first container.

6 Claims, 2 Drawing Sheets

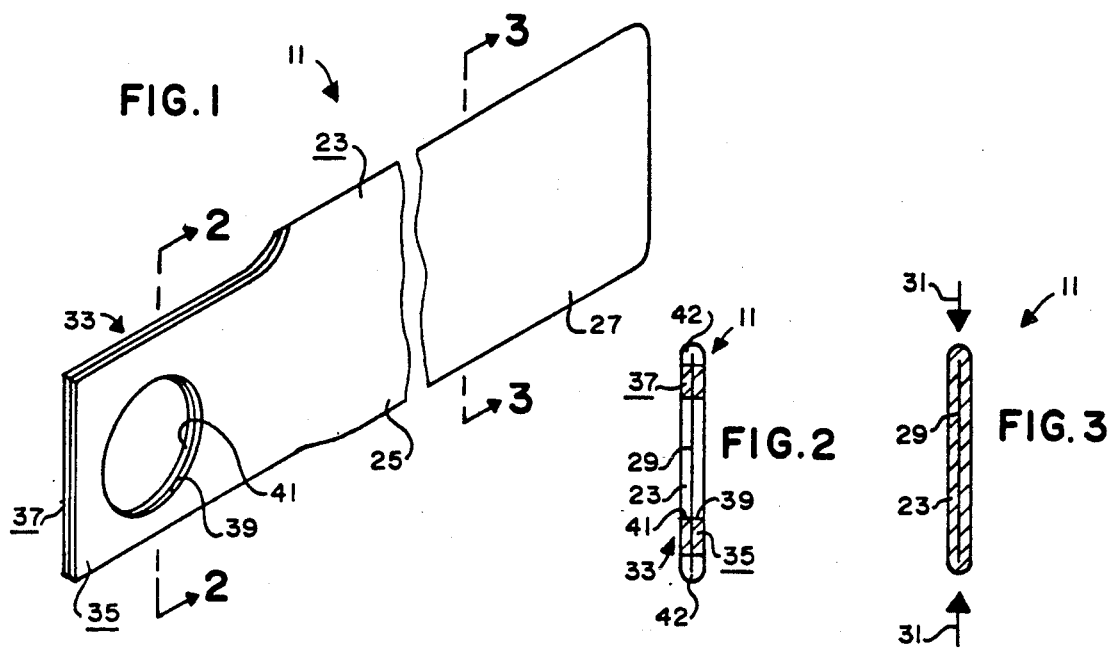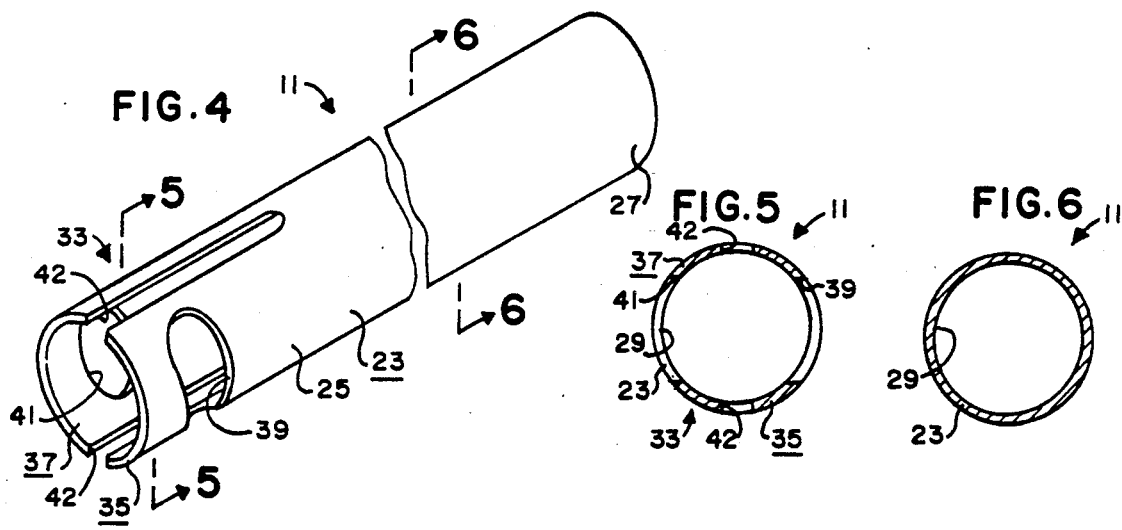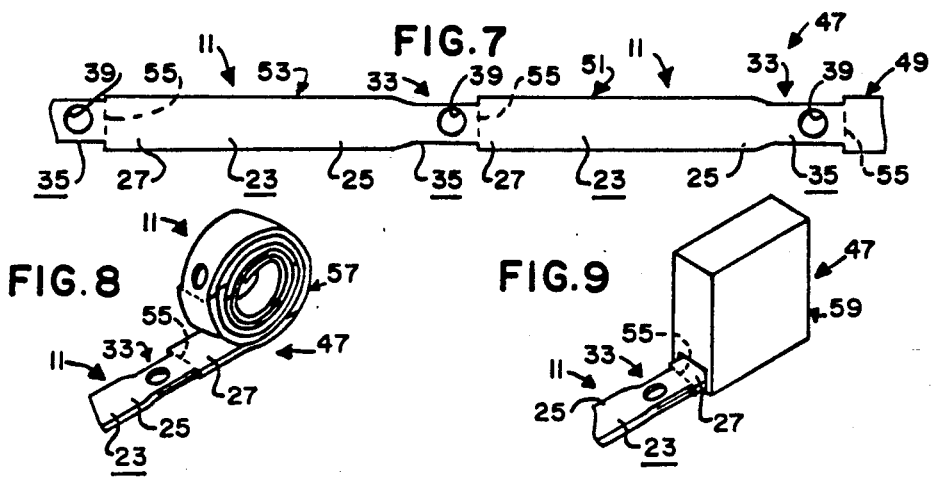

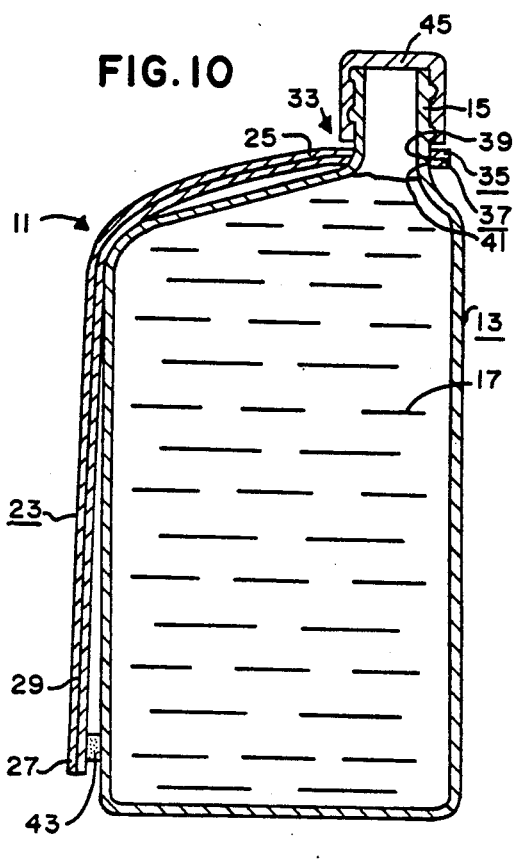
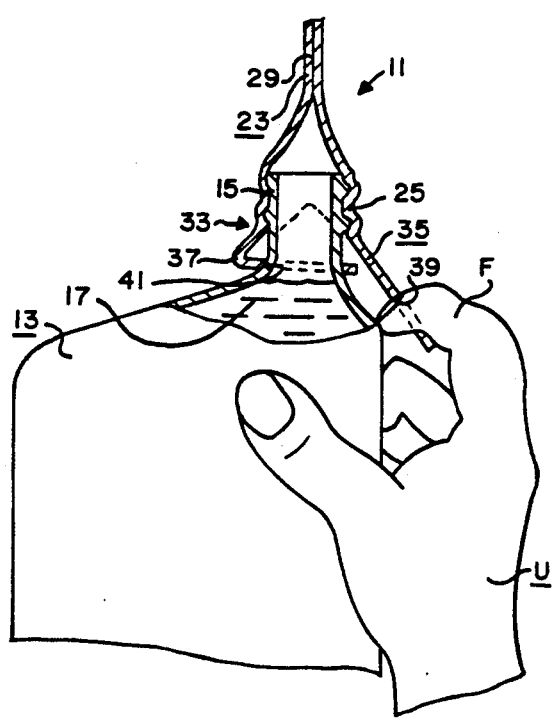
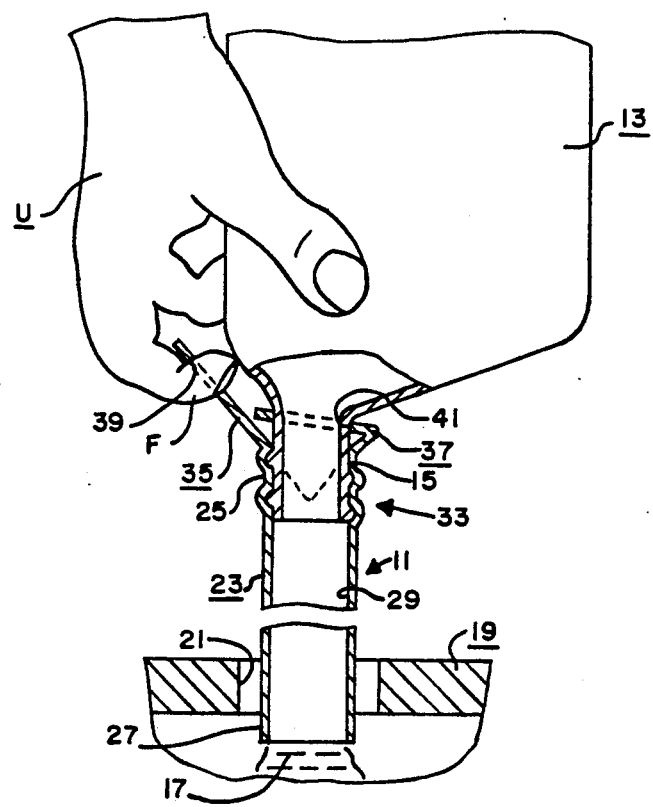

FLEXIBLE TUBE ATTACHABLE TO A SPOUT HAVING A FINGER TAB TO MAINTAIN ATTACHMENT

BACKGROUND OF THE INVENTION

1. Field of the Invention

The present invention relates, in general, to means for use in transferring a pourable substance from one container into another.

2. Information Disclosure Statement

A preliminary patentability search conducted in class 141, subclasses 337, 338, and 391, and in class 222, subclass 567 produced the following patents which may be relevant to the present invention:

Martinsen, U.S. Pat. No. 2,580,811, discloses a funnel formed with an arcuate cut-out portion to semicircumferentially engage a projecting pouring spout of a container. A spring is provided to clamp the funnel securely into engagement with the pouring spout of the container.

Klygis, U.S. Pat. No. 3,726,447, discloses a plastic container spout for mounting on the outer surface of a container and slidably movable between a substantially juxtaposed retraced position and an extended pouring position. The spout has a body portion in the general shape of a trapezoid and has a band made integral with the body portion for encircling the container.

Klygis et al., U.S. Pat. No. 4,009,805, discloses a plastic pouring spout for mounting on the outer surface of a container and slidably movable between a substantially juxtaposed retracted position and an extended pouring position. The spout has a body portion and a band made integral with the body portion for encircling the container. The body portion can be partially separated from the band when in the extended position and the opposite side edges thereof brought together to form a funnel-like portion.

Kaufman, U.S. Pat. No. 4,108,222, discloses a collapsible funnel having a body portion and a movable dam forming an integral part of the body portion located adjacent a fluid inlet for the funnel to prevent fluid from spilling out the inlet end of the funnel. The dam is in the form of a movable wedge-like member.

Greenhow et al., U.S. Pat. No. 4,111,340, discloses a pouring spout for the threaded neck of a container. The pouring spout includes a rectangular sheet of plastic having first and second edges, a filler neck opening intermediate the first and second edges, and a trough that is formed by securing a portion of the first edge to a portion of the second edge.

Bourbon, U.S. Pat. No. 4,231,497, discloses a pouring spout for oil drums. The pouring spout includes an attachment for being secured to the neck of the oil drum in a direction generally transverse to the axis of the opening through the neck. The pouring spout includes a chute connected to the attachment by an articulation zone. The chute is provided with catch-type assembly members which cooperate with complimentary members carried by the attachment and which together ensure the maintenance and immobilization of the chute in a direction differing from that of the attachment.

Hess et al., U.S. Pat. No. 4,825,915, discloses a disposable funnel defined by a generally frusto-conical tubular sheet material body having longitudinally opposite ends defining openings of two different sizes, at least one bond line between the opposite ends defining a longitudinal bonded seam of the body, and a torn edge along the longitudinal bonded seams along which the funnel is torn from other generally identical funnels of a funnel sheet in planar, folded or rolled-up form.

Cowles, U.S. Pat. No. 4,896,707, discloses an adjustable, disposable funnel including a sheet of flexible material which may be hand formed into a selected, conic, funnel shape. Coupling means such as an adhesive strip is provided for holding the sheet in the funnel shape.

It is well known that an aid of some type is often needed to prevent spillage when liquids, powders, or other pourable substances are poured from one container into another container. This is especially true for pouring oil or the like into the crankcase opening of a motor vehicle such as an automobile, truck, tractor, or the like.

Conventional funnels are typically constructed as a rigid, inverted cone-shaped member and are widely used for pouring oil or the like from a container (oil can or bottle) into the crankcase opening of a motor vehicle or the like. However, since rigid, cone-shaped funnels take up considerable storage room and often drip oil and the like long after they have been used, such funnels are often not stored in automobiles and cannot be located when needed. Many of the above identified patents disclose various attempts to provide funnels which require very little storage room and which can be disposed of after use.

In addition, oil containers have recently been designed out of extruded plastic with an elongated pour spout. While such oil containers help prevent spillage when oil is poured therefrom, some spillage still frequently occurs.

Nothing in the above patents or prior art discloses or suggests the present invention. More specifically, none of the above patents disclose or suggest a dispensing means including, in general, a flexible tube having an opened first end for being positioned on the pour spout of a first container, having an opened second end for being positioned adjacent the inlet opening of a second container, and having an opened interior extending between the opened first end and the opened second end for allowing the contents of the first container to be poured through the opened interior of the tube from the pour spout of the first container into the inlet opening of the second container; and securing means for securing the opened first end of the tube on the pour spout of the first container.

SUMMARY OF THE INVENTION

The present invention is directed toward providing an improved means for use in transferring a pourable substance from one container into another container so that spillage is eliminated. The concept of the present invention is to provide a flexible sleeve having an opened first end for being secured to the pour spout of the first container and having an opened second end for being directed into the interior of the second container.

The dispensing means of the present invention includes, in general, a flexible tube having an opened first end for being positioned on the pour spout of a first container, having an opened second end for being positioned adjacent the inlet opening of a second container, and having an opened interior extending between the opened first end and the opened second end for allowing the contents of the first container to be poured through the opened interior of the tube from the pour spout of the first container into the inlet opening of the second container; and securing means for securing the opened first end of the tube on the pour spout of the first container.

BRIEF DESCRIPTION OF THE DRAWINGS

FIG. 1 is a perspective view of the dispensing means of the present invention in a collapsed, substantially flat position, with portions thereof broken away for clarity.

FIG. 2 is a sectional view substantially as taken on line 2—2 of FIG. 1.

FIG. 3 is a sectional view substantially as taken on line 3—3 of FIG. 1.

FIG. 4 is a perspective view of the dispensing means of the present invention in a rounded, opened position, with portions thereof broken away for clarity.

FIG. 5 is a sectional view substantially as taken on line 5—5 of FIG. 4.

FIG. 6 is a sectional view substantially as taken on line 6—6 of FIG. 4.

FIG. 7 is a top plan view of a plurality of the dispensing means of the present invention.

FIG. 8 is a perspective view of a plurality of the dispensing means of the present invention in a roll.

FIG. 9 is a perspective view of the roll of FIG. 8 in a container.

FIG. 10 is a sectional view of the dispensing means of the present invention shown attached to a first container in a stored position.

FIG. 11 is a sectional view of a portion of the dispensing means of the present invention shown with the first end thereof positioned on the pour spout of a first container.

FIG. 12 is a sectional view of a portion of the dispensing means of the present invention shown with the first end thereof positioned on the pour spout of a first container and with the second end thereof positioned within the inlet opening of a second container in an in-use position.

DESCRIPTION OF THE PREFERRED EMBODIMENT

The preferred embodiment of the dispensing means of the present invention is shown in FIGS. 1-12 and identified by the numeral 11. The dispensing means 11 is for use in combination with a first container 13 having a mouth or pour spout 15 through which the contents 17 of the first container 13 can be poured, and a second container 19 having an inlet opening 21 into which the contents 17 of the first container 13 can be poured. For example, the first container 13 may consist of a typical quart bottle of motor oil, the contents 17 of the first container 13 may consist of liquid motor oil, and the second container 19 may consist of the crankcase, etc., of an automobile engine or the like. However, the first container 1 3 may consist of various size and shape containers for pourable substances including liquid, powder, and the like. Thus, the first container 13 may consist of a one gallon can of antifreeze, the contents 17 of the first container 13 may consist of liquid antifreeze, and the second container 19 may consist of an automobile radiator or the like.

The dispensing means 11 includes a flexible tube 23 having an opened first end 25 for being positioned on the pour spout 15 of the first container 13, having an opened second end 27 for being positioned adjacent or within the inlet opening 21 of the second container 19, and having an opened interior 29 extending between the opened first end 25 and the opened second end 27 for allowing the contents 17 of the first container 13 to be poured through the opened interior 29 of the tube 23 from the pour spout 15 of the first container 13 into the inlet opening 21 of the second container 19 (see, in general, FIG. 12). The tube 23 is preferably movable between a flat, collapsed position as shown in FIGS. 1-3 and a round, opened position as shown in FIGS. 4-6. More specifically, the tube 23 is preferably constructed in such a manner that it will normally be in the flat, collapsed position until pressure is applied to the opposite sides thereof in the direction of the arrows 31 in FIG. 3. When pressure is applied to the opposite sides of the tube 23 in the direction of the arrows 31 in FIG. 3, the tube 23 will move to the opened position as shown in FIGS. 4-6. The tube 23 can be constructed and manufactured in various manners and out of various materials. Preferably, the tube 23 is manufactured out of a flexible, translucent plastic having a wall thickness that allows the tube 23 to collapse upon itself to form the flat profile shown in FIGS. 1-3 and yet when squeezed at the folds (e.g., when pressure is applied to the opposites sides in the direction of the arrows 31), it can be moved to the tubular, opened profile shown in FIGS. 4-6). More specifically, the tube 23 is preferably extruded out of a low density polyethylene with a wall thickness of approximately 2 to 4 mils (i.e., 0.002 to 0.004 inches), in any manner now apparent to those skilled in the art. While the actual size of the tube 23 may vary depending on the diameter of the pour spout 15 and the typical distance between the first container 13 and the inlet opening 21 of the second container 19 as the contents 17 of the first container 13 is poured into the second container 19, etc., the first end 25 of the tube 23 is preferably sized to fit snugly over the pour spout 15 as shown in FIGS. 11 and 12, and the second end 27 of the tube 23 is preferably sized to easily extend into the inlet opening 21 as shown in FIG. 12. It should be noted that the diameter of the pour spout of standard plastic and glass threaded containers for motor oil, antifreeze, and the like have standardized dimensions. Thus, the outer diameter of the typical pour spout for plastic quart motor oil containers are 28 millimeters while the outer diameter of the typical pour spout for plastic gallon antifreeze containers are 38 millimeters. The thread style of both standard quart motor oil containers and standard gallon antifreeze containers is a 400 style as will now be apparent to those skilled in the art. The tube 23 may be constructed in a first size (e.g., 28 millimeter inner diameter) and a first wall thickness (e.g., 0.002 inches) for use with standard quart plastic oil containers and in a second size (e.g. 38 millimeter inner diameter) and a second wall thickness (e.g., 0.004 inches) for fitting over the pour spout of standard plastic antifreeze containers.

The dispensing means includes securing means 33 for securing the opened first end 25 of the tube 23 on the pour spout 15 of the first container 13. The securing means 33 preferably includes tab means coupled to the opened first end 25 of the tube 23 for being manually grasped by the user U of the dispensing means 11 to hold the opened first end 25 of the tube 23 on the pour spout 15 of the first container 13 as clearly shown in FIGS. 11 and 12. More specifically, the securing means 33 preferably includes first tab means 35 coupled to the opened first end 25 of the tube 23 for being manually grasped by the user U of the dispensing means 11 to hold the opened first end 25 of the tube 23 on the pour spout 15 of the first container 13, and preferably includes second tab means 37 coupled to the opened first end 25 of the tube 23 for being mounted on the pour spout 15 of the first container 13 to hold the opened first end 25 of the tube 23 on the pour spout 15 of the first container 13. The first tab means 35 preferably has an aperture 39 therethrough for receiving a finger F of the user U of the dispensing means 11 to allow the user U of the dispensing means to easily grasp the first tab means 35 as clearly shown in FIGS. 11 and 12. The second tab means 37 preferably has an aperture 41 therethrough for receiving the pour spout 15 of the first container 13 as clearly shown in FIGS. 11 and 12. The tab means 35, 37 can be constructed and manufactured in various manners and out of various materials. Preferably, the tab means 35, 37 are manufactured out of a flexible, translucent plastic. More specifically, the tab means 35, 37 are preferably extruded out of the same low density polyethylene as the tube 23 as a one-piece, integral unit with the tube 23 and with the apertures 39, 41 cut thereinto by die means or the like in any manner now apparent to those skilled in the art. In addition, slots 42 are preferably cut into the sides of the tab means 35, 37 by the die means or the like to separate the tab means 35, 37 from one another as will now be apparent to those skilled in the art.

The dispensing means 11 may include securing means 43 for securing the second end 27 of the tube 23 to the first container 13 as clearly shown in FIG. 10. More specifically, the dispensing means 11 may be designed for being attached to the first container 13 so that the first container 13 and the dispensing means 11 can be sold as a package in a manner so that the dispensing means 11 consumes no space during shipping or shelf storage of the package. Thus, during manufacture or packing of the first container 13, the pour spout 15 of the first container 13 is inserted through the apertures 39, 41 of both tab means 35, 37 and a cap 45 or the like is then attached to the pour spout 15 over both tab means 35, 37 as clearly shown in FIG. 10 to thereby secure the dispensing means 11 to the first container 13. The second end 27 of the tube 23 may then be secured to the first container 13 by the securing means 43. The securing means 43 may consist of glue, tape, double-sided tape, or the like as will now be apparent to those skilled in the art.

Rather than being attached to the first container 13 as a package, the dispensing means 11 may be packaged separately or may be packaged with a plurality of like dispensing means 11. Thus, the present invention may include an article of manufacture 47 including a plurality of dispensing means 11 joined to one another end-to-end as clearly shown in FIG. 7. More specifically, the article of manufacture 47 preferably includes a first dispensing means 49, a second dispensing means 51, and a third dispensing means 53 with each dispensing means 49, 51, 53 being identical in construction to the dispensing means 11 but with the securing means 43 of the second dispensing means 51 being removably attached to the second end 27 of the tube 23 of the first securing means 49 and with the securing means 43 of the third dispensing means 53 being removably attached to the second end 27 of the tube 23 of the second securing means 51 as shown in FIG. 7. Various elements of the first, second, and third dispensing means 49, 51, 53 are identified herein and in FIGS. 7-8 by the same numerals that are used herein to identify the corresponding elements of the dispensing means 11. The first, second and third dispensing means 49, 51, 53 are preferably constructed as a one-piece, integral unit with perforations 55 or the like provided therebetween for allowing easy separation thereof. Thus, the one-piece, integral unit is preferably constructed by first extruding a one-piece, elongated tube or sleeve out of a low density polyethylene with a wall thickness of approximately 2 to 4 mils (i.e., 0.002 to 0.004 inches), in any manner now apparent to those skilled in the art. The apertures 39, 41, slots 42, and perforations 55 are then preferably cut into the elongated tube or sleeve with die means or the like as will now be apparent to those skilled in the art. The elongated tube or sleeve can then be formed into a roll 57 (see FIG. 8) and stored within a dispensing box 59 (see FIG. 9) to allow one or more dispensing means to be torn therefrom when needed.

The use of the present invention is quite simple. First, when the dispensing means 11 is secured to the first container as shown in FIG. 10, the securing means 43 between the second end 27 of the tube 23 and the first container 13 is broken and the cap 45 is removed from the pour spout 15. The first tab means 35 is removed from the pour spout 15 by merely pulling the first tab means 35 away from the pour spout 15 until the aperture 39 disengages the pour spout 15. When no dispensing means is secured to the first container 13, a separate dispensing means 11 is selected or one of a plurality of dispensing means 49, 51, 53 is torn from a roll thereof. Next, the pour spout 15 is inserted into the first end 25 of the tube 23. The first end 25 of the tube 23 is pulled over the pour spout 15 until a snug fit therebetween is formed. The user U can insert a finger F through the aperture 39 in the first tab means 35 as shown in FIGS. 11 and 12 in order to secure the tube 23 over the pour spout 15 while pouring, etc. The sides of the tube 23 are then squeezed together to apply pressure to the tube 23 in the direction of the arrows 31 in FIG. 3 to cause the tube 23 to move from the closed, flat profile to the opened, tubular profile. The second end 27 of the tube 23 is then placed into the inlet opening 21 of the second container 19. The first container 13 is inverted as shown in FIG. 12 and, at the same time, the sides of the tube 23 are squeezed together to remove any kinks that may have formed in the tube 23. The contents 17 of the first container 13 will then pass through the interior 29 of the tube 23 into the second container 19 without spillage. After the contents 17 have been transferred, the used dispensing means can be properly disposed of with the first container 13. Since the dispensing means is preferably made of low density polyethylene, it can be recycled. Further, since most modern oil bottles are made of high density polyethylene, the dispensing means can be recycled with such oil bottles.

Although the present invention has been described and illustrated with respect to a preferred embodiment and a preferred use therefor, it is not to be so limited since modifications and changes can be made therein which are within the full intended scope of the invention.

We claim:

1. Dispensing means for use in combination with a first container having a pour spout through which the contents of said first container can be poured, and a second container having an inlet opening into which said contents of said first container can be poured; said dispensing means comprising:

a) a flexible tube having an opened first end for being positioned on said pour spout of said first container, having an opened second end for being positioned adjacent said inlet opening of said second container, and having an opened interior extending between said opened first end and said opened second end for allowing the contents of said first container to be poured through said opened interior of said tube from said pour spout of said first container into said inlet opening of said second container; and b) securing means for securing said opened first end of said tube on said pour spout of said first container; said securing means including first tab means coupled to said opened first end of said tube for being manually grasped by the user of said dispensing means to hold said opened first end of said tube on said pour spout of said first container; said securing means including second tab means coupled to said opened first end of said tube for being mounted on said pour spout of said first container to hold said opened first end of said tube on said pour spout of said first container; said first tab means having an aperture therethrough for receiving a finger of the user of said dispensing means to allow the user of said dispensing means to easily grasp said first tab means.

2. Dispensing means for use with a first container having a pour spout through which the contents of said first container can be poured, and a second container having an inlet opening into which said contents of said first container can be poured; said dispensing means comprising:

a) a flexible tube having an opened first end for being positioned on said pour spout of said first container, having an opened second end for being positioned within said inlet opening of said second container, and having an opened interior extending between said opened first end and said opened second end for allowing the contents of said first container to be poured through said opened interior of said tube from said pour spout of said first container into said inlet opening of said second container; said tube being movable between a flat, collapsed position and a round, opened position;

b) first tab means coupled to said opened first end of said tube for being manually grasped by the user of said dispensing means to hold said opened first end of said tube on said pour spout of said first container; said first tab means having an aperture therethrough for receiving a finger of the user of said dispensing means to allow the user of said dispensing means to easily grasp said first tab means; and c) second tab means coupled to said opened first end of said tube for being mounted on said pour spout of said first container to hold said opened first end of said tube on said pour spout of said first container; said second tab means having an aperture therethrough for receiving said pour spout of said first container.

3. A dispensing means in combination with a first container having a pour spout through which the contents of said first container can be poured, and a second container having an inlet opening into which said contents of said first container can be poured; said dispensing means comprising:

a) a flexible tube having an opened first end positioned on said pour spout of said first container, having an opened second end positioned within said inlet opening of said second container, and having an opened interior extending between said opened first end and said opened second end for allowing the contents of said first container to be poured through said opened interior of said tube from said pour spout of said first container into said inlet opening of said second container; said tube being movable between a flat, collapsed position and a round, opened position;

b) first tab means coupled to said opened first end of said tube for being manually grasped by the user of said dispensing means to hold said opened first end of said tube on said pour spout of said first container; said first tab means having an aperture therethrough for receiving a finger of the user of said dispensing means to allow the user of said dispensing means to easily grasp said first tab means; and c) second tab means coupled to said opened first end of said tube and being mounted on said pour spout of said first container to hold said opened first end of said tube on said pour spout of said first container; said second tab means having an aperture therethrough receiving said pour spout of said first container.

4. A dispensing means in combination with a container having a pour spout through which the contents of said container can be poured, said dispensing means comprising:

a) a flexible tube having an opened first end, an opened second end, and an opened interior;

b) first tab means coupled to said opened first end of said tube and attached to said pour spout of said container;

c) second tab means coupled to said opened first end of said tube and attached to said pour spout of said container; and d) means securing said second end of said tube to said container.

5. The dispensing means of claim 4 in which said second tab means has an aperture through which said pour spout of said container extends.

6. Dispensing means for use in combination with a first container having a pour spout through which the contents of said first container can be poured, and a second container having an inlet opening into which said contents of said first container can be poured; said dispensing means comprising:

a) a flexible tube having an opened first end for being positioned on said pour spout of said first container, having an opened second end for being positioned adjacent said inlet opening of said second container, and having an opened interior extending between said opened first end and said opened second end for allowing the contents of said first container to be poured through said opened interior of said tube from said pour spout of said first container into said inlet opening of said second container; and b) securing means for securing said opened first end of said tube on said pour spout of said first container; said securing means including tab means coupled to said opened first end of said tube for being manually grasped by the user of said dispensing means to hold said opened first end of said tube on said pour spout of said first container; said tab means having an aperture therethrough for receiving a finger of the user of said dispensing means to allow the user of said dispensing means to easily grasp said tab means.

* * * * *